United States Patent
Kwon et al.

(10) Patent No.: US 9,984,704 B2
(45) Date of Patent: May 29, 2018

(54) VEHICLE CLASSIFICATION SYSTEM AND METHOD

(71) Applicant: Electronics and Telecommunications Research Institute, Daejeon (KR)

(72) Inventors: Young Jin Kwon, Cheongju-si (KR); Do Hyun Kim, Daejeon (KR); Seung Jun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days. days.

(21) Appl. No.: 15/669,375

(22) Filed: Aug. 4, 2017

(65) Prior Publication Data

US 2018/0040337 A1    Feb. 8, 2018

(30) Foreign Application Priority Data

Aug. 5, 2016  (KR) .......... 10-2016-0100026
Jul. 31, 2017  (KR) .......... 10-2017-0096677

(51) Int. Cl.
*H04R 29/00*    (2006.01)
*G10L 25/51*    (2013.01)

(52) U.S. Cl.
CPC .............. *G10L 25/51* (2013.01); *H04R 29/00* (2013.01)

(58) Field of Classification Search
CPC .................. G10L 25/51; H04R 29/00
See application file for complete search history.

(56) References Cited

U.S. PATENT DOCUMENTS

| | | |
|---|---|---|
| 7,505,850 B2 | 3/2009 | Kim et al. |
| 2006/0116821 A1 | 6/2006 | Kim et al. |
| 2014/0037142 A1 | 2/2014 | Bhanu et al. |
| 2014/0049419 A1* | 2/2014 | Lehning ............... G08G 1/0116 342/107 |
| 2014/0049420 A1* | 2/2014 | Lehning ................... G01S 7/41 342/109 |
| 2014/0156661 A1 | 6/2014 | Yoo et al. |
| 2015/0046119 A1 | 2/2015 | Sandhawalia et al. |

FOREIGN PATENT DOCUMENTS

| | | |
|---|---|---|
| KR | 100923963 B1 | 10/2009 |
| KR | 1020090108363 A | 10/2009 |
| KR | 1020100031793 A | 3/2010 |
| KR | 1020120125741 A | 11/2012 |
| KR | 101267991 B1 | 5/2013 |
| KR | 1020130097849 A | 9/2013 |
| KR | 1020140055916 A | 5/2014 |

* cited by examiner

*Primary Examiner* — Simon King
(74) *Attorney, Agent, or Firm* — William Park & Associates Ltd.

(57) ABSTRACT

Disclosed is vehicle classification technology. A vehicle classification system includes a sound generation module configured to generate a sound caused by friction with a wheel of a passing vehicle and a sensor node configured to collect the sound generated by the sound generation module, analyze the collected sound to acquire axle information, and classify a model of the vehicle on the basis of the acquired axle information.

14 Claims, 5 Drawing Sheets

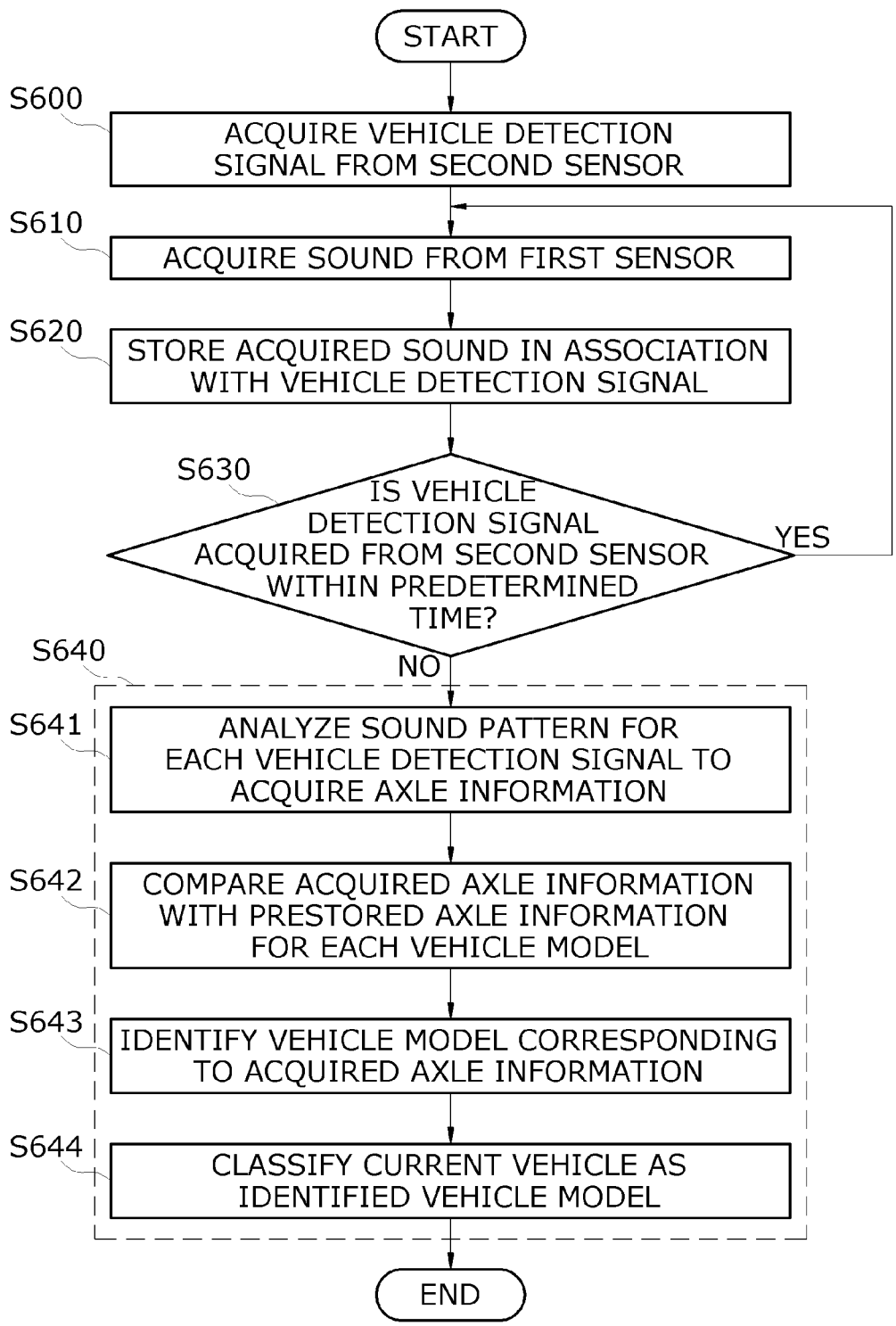

VEHICLE CLASSIFICATION SYSTEM AND METHOD

CROSS-REFERENCE TO RELATED APPLICATION

This application claims priority to and the benefit of Korean Patent Application No. 2016-0100026, filed on Aug. 5, 2016 and Korean Patent Application No. 2017-0096677, filed on Jul. 31, 2017, the disclosure of which is incorporated herein by reference in its entirety.

BACKGROUND

1. Field

The present invention relates to vehicle model classification technology, and more particularly, to a vehicle classification system and method capable of performing vehicle model classification by means of a non-contact sensor.

2. Discussion of Related Art

As is well known, a vehicle detection system, which is an infrastructure for a data collection system, collects data such as a traffic volume, a speed, an occupancy, and a vehicle length over all traffic management sections in real time and provides accurate information to a traffic information center in accordance with a traffic management strategy.

Also, a vehicle detection system also performs a vehicle model classification function. To this end, the vehicle detection system needs axle information of a vehicle passing through a detection point.

A conventional vehicle detection system is configured to acquire axle information of a vehicle by means of a loop detector and a piezo wire buried in a detection point.

In addition, there is a vehicle detection system using a wireless sensor node, and the vehicle detection system also uses a piezo wire to acquire axle information.

Since a method using a piezo wire utilizes a principle in which an output is generated when a certain pressure or more is applied to a sensor, the piezo wire is continuously exposed to impacts caused by vehicle loads.

Accordingly, piezo wires are frequently broken due to continuous impacts applied by vehicles and also damaged due to shocks during road maintenance.

Also, when piezo wires are buried in an asphalt road, the piezo wires may be broken by a force applied in a direction in which vehicles are running.

SUMMARY

Accordingly, the present invention has been proposed to solve the above-mentioned problems, and the present invention is directed to providing a vehicle classification system and method capable of performing vehicle model classification by means of a non-contact sensor.

According to an aspect of the present invention, there is a vehicle classification system including a sound generation module configured to generate a sound caused by friction with a wheel of a passing vehicle and a sensor node configured to collect the sound generated by the sound generation module, analyze the collected sound to acquire axle information, and classify a model of the vehicle on the basis of the acquired axle information.

The sound generation module may be implemented in the form of a bar or a groove and may be disposed behind the sensor node with respect to a vehicle traveling direction.

The sensor node may include a sensor module including a first sensor configured to collect the sound generated by the sound generation module and a second sensor configured to detect the vehicle and a control unit configured to analyze the sound collected by the first sensor to acquire the axle information and classify the model of the vehicle on the basis of the acquired axle information.

The control unit may activate the first sensor after receiving a vehicle detection signal from the second sensor and analyze the sound transmitted from the first sensor to acquire the axle information.

The control unit may periodically acquire noise from a current road environment and remove an area corresponding to the acquired noise from the sound collected by the first sensor.

The control unit may determine that a sound transmitted from the first sensor after the vehicle detection signal is received from the second sensor is the sound used to acquire the axle information when the noise is acquired from the first sensor and may determine whether the second sensor detects a vehicle and then determine that sounds transmitted from the first sensor during a certain time when there is no vehicle are noise.

According to another aspect of the present invention, there is a vehicle classification method performed by a control unit, the vehicle classification method including acquiring a vehicle detection signal from a second sensor, acquiring a sound transmitted from a first sensor, storing the acquired sound in association with the vehicle detection signal, determining whether the vehicle detection signal is acquired from the second sensor within a predetermined time, and classifying a model of each vehicle on the basis of a result of analyzing a sound stored for each vehicle detection signal when it is determined that the vehicle detection signal is not acquired.

The vehicle detection signal may be transmitted by the second sensor to the control unit when the vehicle enters a detection area.

The sound may be generated by friction between a sound generation module and a wheel of the vehicle while the vehicle is passing on the sound generation module.

When it is determined that the vehicle detection signal is acquired, the control unit may acquire the sound.

The classifying of a vehicle model may include analyzing a pattern of the sound for each vehicle detection signal to acquire axle information, comparing the acquired axle information with prestored axle information for each vehicle model, and identifying a vehicle model corresponding to the acquired axle information and classifying a current vehicle as the identified vehicle model.

The vehicle classification method may further include periodically acquiring and storing noise in a current road environment and removing an area corresponding to the stored noise from the acquired sound.

The periodically acquiring and storing of the noise may include determining that a sound transmitted from the first sensor after the vehicle detection signal is received from the second sensor is the sound used to classify a vehicle model and determining whether the second sensor detects the vehicle and then determining that sounds transmitted from the first sensor during a certain time when there is no vehicle are noise.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 6 is a flowchart illustrating operation of a vehicle classification system according to an example embodiment of the present invention.

DETAILED DESCRIPTION OF EXEMPLARY EMBODIMENTS

Figure 1:
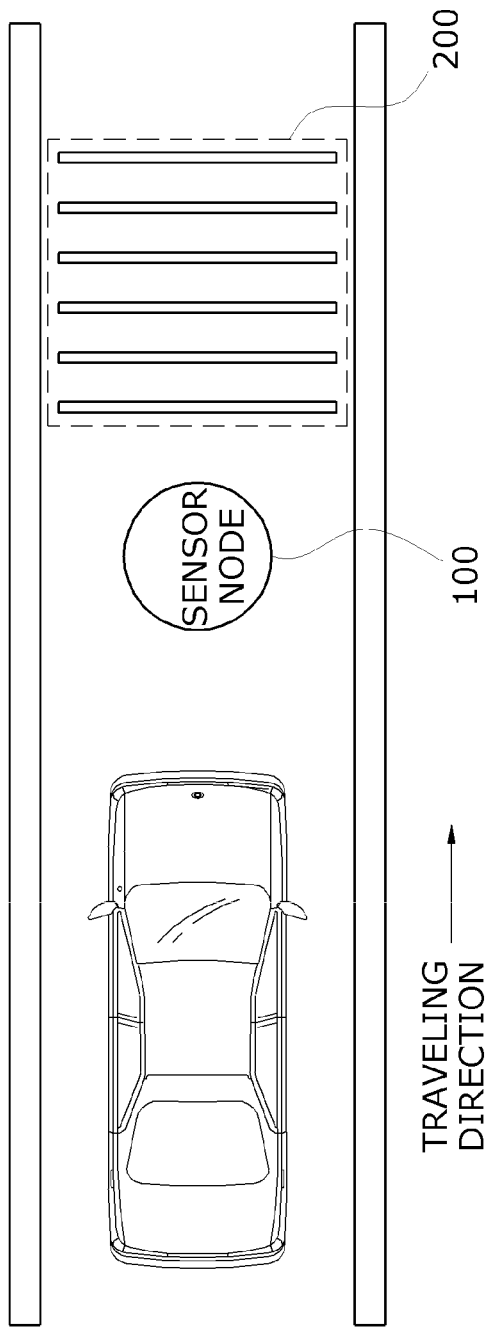
FIG. 1 is a diagram showing an example in which a vehicle classification system is applied according to an example embodiment of the present invention.

Specific structural and functional details disclosed herein are merely representative for the purpose of describing example embodiments. However, the present invention may be embodied in many alternate forms and is not to be construed as being limited to only the example embodiments set forth herein.

While the present invention is susceptible to various modifications and alternative forms, specific embodiments thereof will be described in detail and shown by way of example. It should be understood, however, that there is no intent to limit example embodiments of the present invention to the particular forms disclosed. Conversely, example embodiments are to cover all modifications, equivalents, and alternatives falling within the scope of the invention.

It should be understood that, although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of the present invention.

It should be understood that when an element is referred to as being "connected" or "coupled" to another element, the element can be directly connected or coupled to the other element or intervening elements may be present. On the other hand, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to limit the invention. As used herein, the singular forms "a," "an," and "the" are intended to include the plural forms as well, unless the context clearly indicates otherwise. It should be further understood that the terms "comprises," "comprising," "includes," "including," and/or "having" specify the presence of stated features, integers, steps, operations, elements, and/or components when used herein, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It should be further understood that terms, e.g., those defined in commonly used dictionaries, should be interpreted as having a meaning that is consistent with their meaning in the context of the relevant art and are not to be interpreted in an idealized or overly formal sense unless expressly so defined herein.

It should also be noted that in some alternative implementations, functions/acts noted in a specific block may occur out of the order noted in a flowchart. For example, two blocks shown in succession may in fact be executed substantially concurrently or may sometimes be executed in a reverse order depending upon functionality or acts involved.

FIG. 1 is a diagram showing an example in which a vehicle classification system is applied according to an example embodiment of the present invention.

Referring to FIG. 1, a vehicle classification system according to an example embodiment of the present invention is implemented to classify vehicle models on the basis of axle information acquired by analyzing information collected by a sensor node.

According to an embodiment of the present invention, the vehicle classification system may include a sensor node 100 and a sound generation module 200.

In this case, the sensor node 100 and the sound generation module 200 may be appropriately disposed such that a sound generated by the sound generation module 200 is collected by the sensor node 100 as the best quality of sound.

The sensor node 100 is implemented to collect a sound generated by the sound generation module 200, analyze the collected sound to acquire axle information, and classify vehicle models on the basis of the acquired axle information.

When the sensor node 100 collects a sound generated by the sound generation module 200, the sensor node 100 also collects noise generated in a road environment in addition to the sound generated by the sound generation module 200.

Accordingly, the sensor node 100 may be configured in a state in which noise other than the sound generated by the sound generation module 200 is not affected as much as possible.

Also, the sensor node 100 may be fixedly installed, for example, buried in a road or may be implemented in a portable form so that the sensor node 100 is removable from a road.

A detailed configuration of the sensor node 100 will be described below with reference to FIG. 4.

The sound generation module 200 is implemented to generate sounds used by the sensor node 100 to classify vehicle models.

In this case, the sound generation module 200 may be fixedly or removably disposed on a road, depending on cases.

Also, the sound generation module 200 may be disposed behind the sensor node 100 with respect to a vehicle traveling direction.

The sound generation module 200 is installed near the sensor node 100 and configured to generate a sound when a vehicle is passing.

Figure 2:
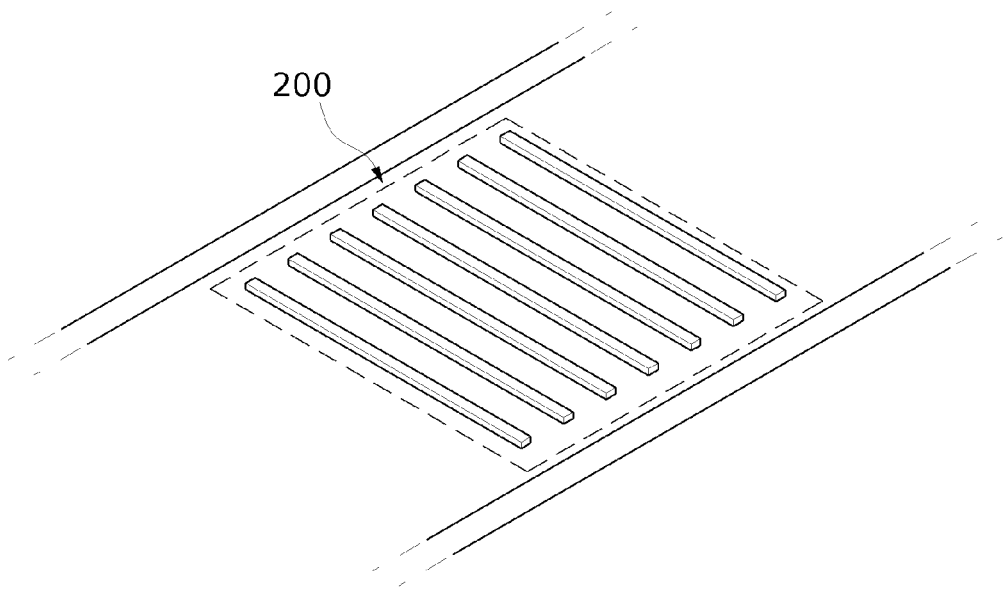
FIG. 2 is a diagram showing an example in which a sound generation module is implemented in the form of a bar according to an example embodiment of the present invention.
Figure 3:
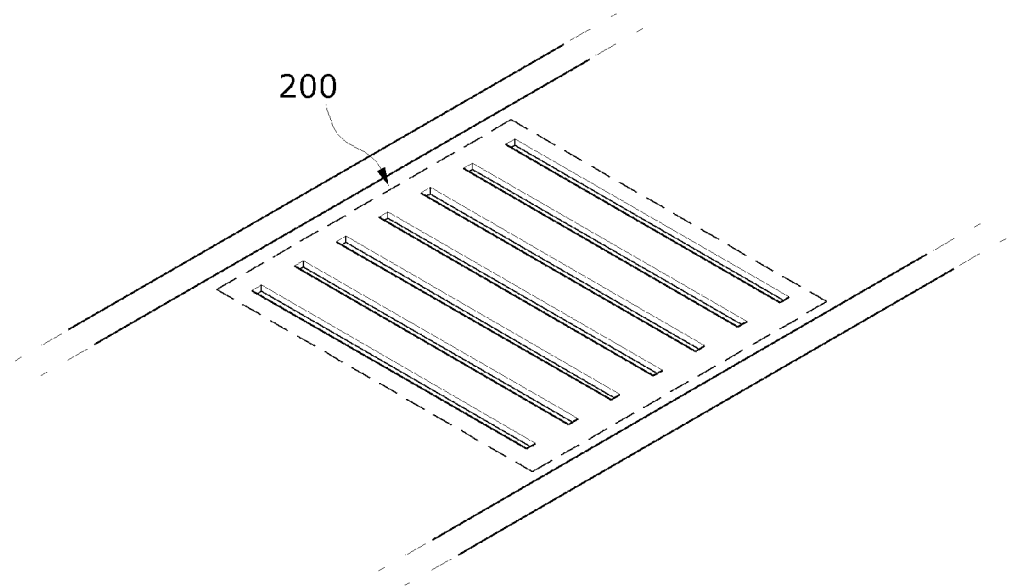
FIG. 3 is a diagram showing an example in which a sound generation module is implemented in the form of a groove according to an example embodiment of the present invention.

FIG. 2 is a diagram showing an example in which a sound generation module is implemented in the form of a bar according to an example embodiment of the present invention, and FIG. 3 is a diagram showing an example in which a sound generation module is implemented in the form of a groove according to an example embodiment of the present invention.

For example, as shown in FIG. 2, the sound generation module 200 may be installed in the form of a bar and attachable to a road.

As another example, as shown in FIG. 3, the sound generation module 200 may be a groove formed by digging.

In FIGS. 2 and 3, the sound generation module 200 is shown as being composed of a plurality of bars and a plurality of grooves. However, the sound generation module 200 may be formed as a single bar or a single groove.

Also, the sound generation module 200 may have a bar or groove with various lengths, thickness, and width set depending on road conditions.

A sensor node according to an example embodiment of the present invention will be described in detail below with reference to FIG. 4.

Figure 4:
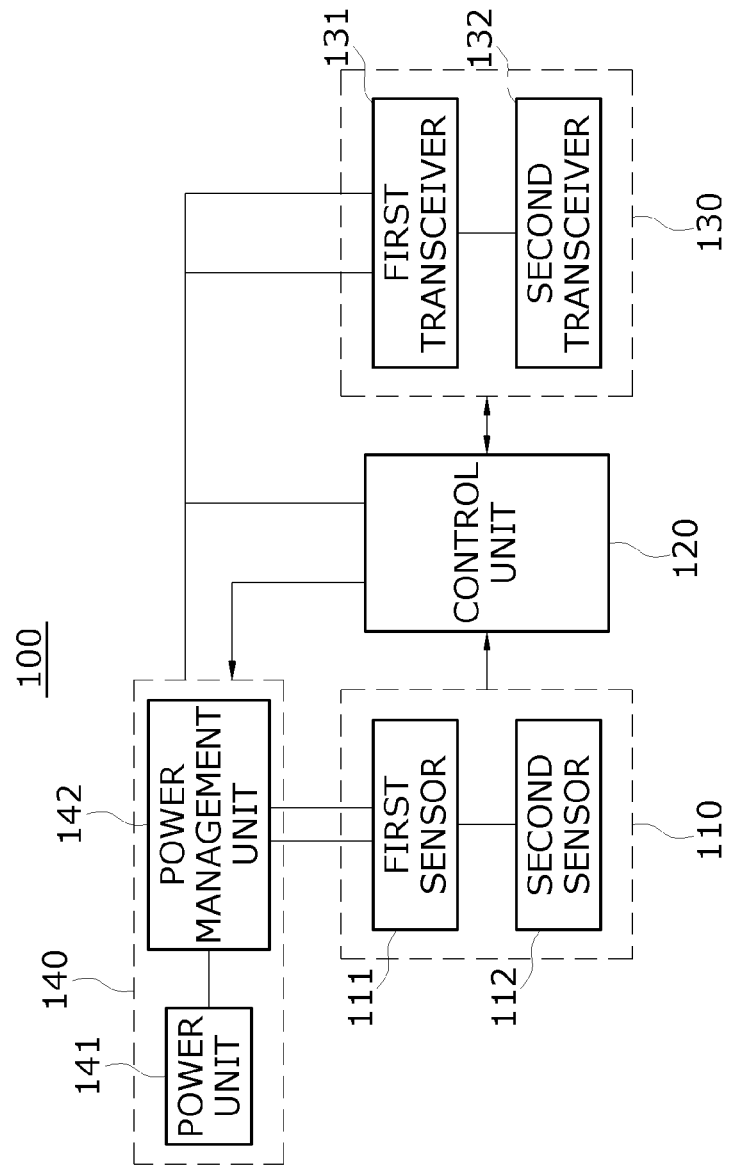
FIG. 4 is a diagram showing an example configuration of a sensor node according to an example embodiment of the present invention.

FIG. 4 is a diagram showing an example configuration of a sensor node according to an example embodiment of the present invention.

Referring to FIG. 4, the sensor node 100 of the present invention is implemented to collect a sound generated by the sound generation module 200, analyze the collected sound to acquire axle information, and classify vehicle models on the basis of the acquired axle information.

To this end, the sensor node 100 may include at least one or more memories configured to store an algorithm needed to perform a vehicle model classification function and a result of performing the function, at least one or more processors configured to perform the function, a power module configured to supply power, and a communication module configured to communicate with the outside.

In detail, the sensor node 100 may include a sensor module 110, a control unit 120, a transceiver module 130, and a power supply module 140.

The sensor module 110 is configured to collect information on running vehicles and may include a first sensor 111 and a second sensor 112.

The first sensor 111 may collect a sound generated by the sound generation module 200 and may transmit the collected sound to the control unit 120.

In particular, the first sensor 111 collects a sound caused by friction between the sound generation module 200 and a vehicle wheel while a vehicle is passing on the sound generation module 200.

Also, the second sensor 112 is configured to detect whether a vehicle enters a detection area and may transmit a vehicle detection signal to the control unit 120.

For example, the first sensor 111 may be implemented as a microphone or the like, and the second sensor 112 may be implemented as a geomagnetic sensor, a radar apparatus such as an ultra wideband (UWB) impulse radar, a loop, or the like.

The control unit 120 classifies a model of the detected vehicle on the basis of the information originating from the sensor module 110.

To this end, the control unit 120 may include at least one or more processors configured to perform functions, an algorithm for performing the functions, and a memory configured to store information needed to perform the functions and results of performing the functions.

In detail, the control unit 120 analyses the sound originating from the first sensor 111 to acquire axle information and classifies a model of a corresponding vehicle on the basis of the acquired axle information.

In particular, the control unit 120 may receive the sound from the first sensor 111 and may analyze a pattern of the received sound to acquire axle information.

Then, the control unit 120 may compare the acquired axle information with axle information prestored on a vehicle model basis to classify a model of the corresponding vehicle.

Figure 5:
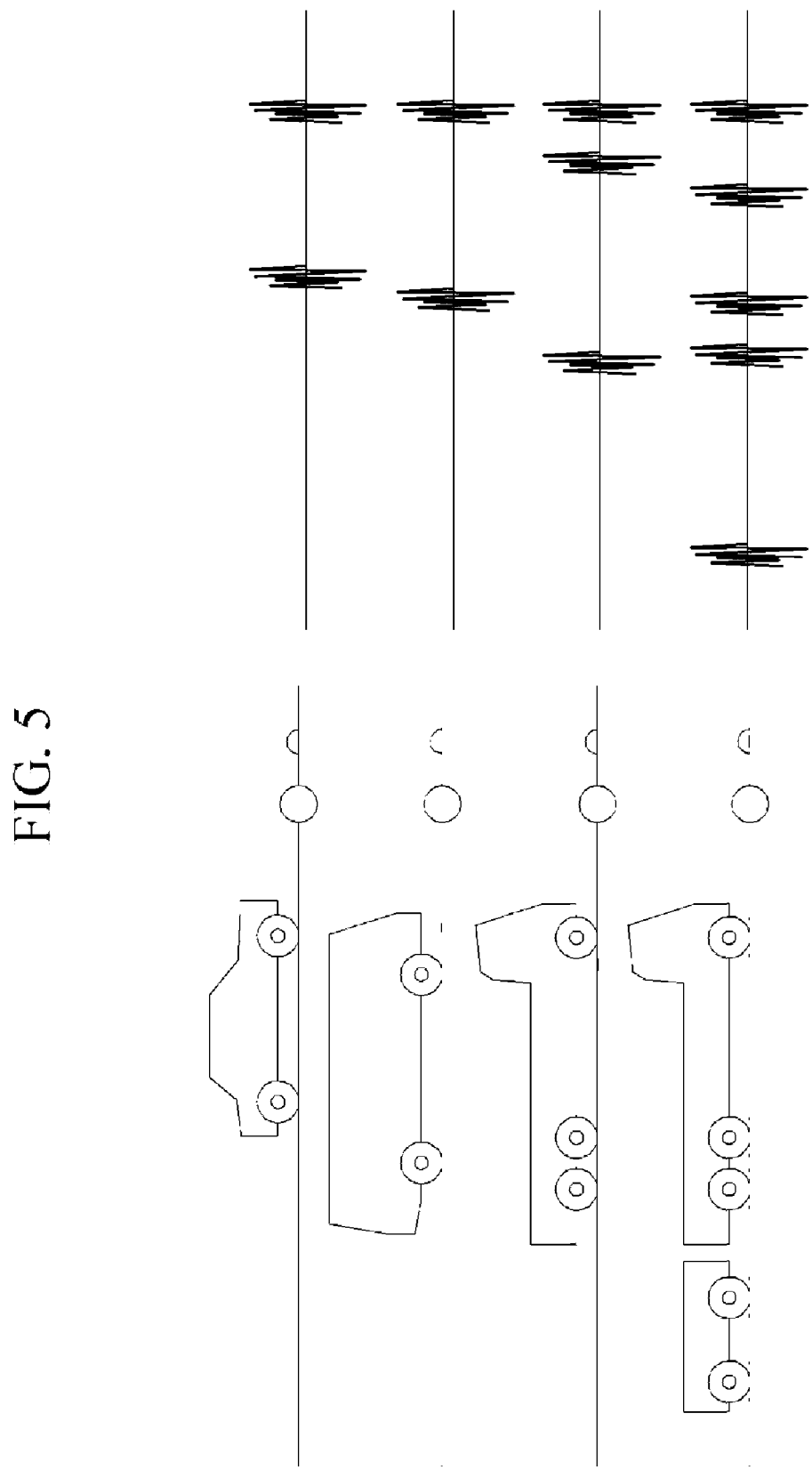
FIG. 5 is a diagram showing an example in which a sound pattern analyzed by a control unit is expressed on a vehicle model basis according to an example embodiment of the present invention.

FIG. 5 is a diagram showing an example in which a sound pattern analyzed by a control unit is expressed on a vehicle model basis according to an example embodiment of the present invention.

As shown in FIG. 5, it can be seen that the sound pattern analyzed by the control unit is different depending on vehicle models.

Meanwhile, when a plurality of vehicles are continuously passing on the sensor node 100, it may be difficult to determine with which of the plurality of vehicles a signal collected by the first sensor 111 is associated.

To this end, the control unit 120 may be implemented to identify a vehicle on the basis of a vehicle detection signal originating from the second sensor 112. In this case, the control unit 120 may activate the first sensor 111 after receiving the vehicle detection signal from the second sensor 112 and may analyze a sound transmitted from the first sensor 111 to acquire axle information.

For example, the control unit 120 may determine that a sound transmitted from the first sensor 111 after a vehicle detection signal at time t (a first vehicle detection signal) is received from the second sensor 112 is a sound associated with a first vehicle and may determine that a sound transmitted from the first sensor 111 after a vehicle detection signal at time t+1 (a second vehicle detection signal) is received from the second sensor 112 is a sound associated with a second vehicle.

Also, depending on road environments, the first sensor 111 may collect noise other than a sound generated by the sound generation module 200 when a vehicle is passing.

Accordingly, the control unit 120 may be implemented to remove the noise from the sound received from the first sensor 111.

Since the road environments may change over time, the control unit 120 may be implemented to periodically acquire and store noise in a current road environment and remove an area corresponding to the noise from the sound received from the first sensor 111.

In this case, the control unit 120 may acquire and store noise collected and transmitted by a separate sensor other than the first sensor 111 or may acquire and store noise collected and transmitted by the first sensor 111.

When the control unit 120 is implemented to acquired noise from the first sensor 111, the control unit 120 may determine that a sound transmitted from the first sensor 111 after a vehicle detection signal is received from the second sensor 112 is a sound used to acquire the axle information and may determine whether the second sensor 112 detects a vehicle and then determine that sounds transmitted from the first sensor 111 during a certain time when there is no vehicle are noise.

The transceiver module 130 is configured to communicate with the outside (e.g., a vehicle information collection AP installed on a roadside, etc.) and may include a first transceiver 131 (a transceiver for wireless communication) and a second transceiver 132 (a transceiver for wired communication).

The transceiver module 130 is publicly used in the technical field of the present invention, and a detailed description thereof will be omitted.

The power supply module 140 is configured to supply power to the components 110 to 130 of the sensor node 100 and may supply power corresponding to rated voltages of the components 110 to 130 to the components 110 to 130.

For example, the power supply module 140 may include only a power unit 141. However, the power supply module 140 may further include a power management unit 142 for providing appropriate voltages to the components 110 to 130 because the rated voltages of the components 110 to 130 are different from each other.

That is, the power management unit 142 may convert power originating from the power unit 141 into voltages appropriate for the components 110 to 130 and supply the voltages to the components 110 to 130.

The components and their functions of the vehicle classification system according to an example embodiment of the present invention have been described so far. The operation of the vehicle classification system according to an example embodiment of the present invention will be described below.

FIG. 6 is a flowchart illustrating the operation of the vehicle classification system according to an example embodiment of the present invention.

The operation shown in FIG. 6 may be implemented by the vehicle classification system that has been described with reference to FIGS. 1 to 5. The control unit 120 acquires a vehicle detection signal from the second sensor 112 (S600).

In this case, when the second sensor 112 detects a vehicle entering a detection area, the second sensor 112 transmits the vehicle detection signal to the control unit 120.

After S600, the control unit 120 acquires a sound transmitted from the first sensor 111 (S610). Also, the control unit 120 stores the acquired sound in association with the vehicle detection signal (S620).

In this case, the first sensor 111 collects a sound caused by friction between the sound generation module 200 and a vehicle wheel while the vehicle is passing on the sound generation module 200, and transmits the collected sound to the control unit 120.

After S620, the control unit 120 determines whether the vehicle detection signal is acquired from the second sensor 112 within a predetermined time (S630).

Here, when a result of the determination in S620 is that the vehicle detection signal is acquired (yes in S630), the control unit 120 performs S610.

On the other hand, when a result of the determination in S620 is that the vehicle detection signal is not acquired (no in S630), the control unit 120 classifies a model of each vehicle on the basis of a result of analyzing a sound stored for each vehicle detection signal (S640).

More specifically with respect to S640, the control unit 120 analyzes a pattern of the sound for each vehicle detection signal to acquire axle information (S641).

After S641, the control unit 120 compares the acquired axle information with prestored axle information for each vehicle model (S642), identify a vehicle model corresponding to the acquired axle information (S643), and classify the vehicle as the identified vehicle model.

According to the present invention, it is possible to secure durability and operating stability of a system by preventing a main sensor from being exposed to consecutive impacts of vehicles that are running.

It is also possible to normalize a system at a low cost even when the system is damaged due to a road abrasion or vehicles because a sound generation module for axle detection is configured as a simple apparatus that does not use an electronic device.

Even though all of the components of the above-described embodiment of the present invention may be combined as one component or operate in combination, the invention is not limited to the embodiment. In other words, all of the components may be selectively combined as one or more components to operate within the scope of the invention. Also, each component may be implemented with one independent hardware device, but some or all of the components may be selectively combined and implemented as a computer program having a program module for performing some or all functions combined in one or more hardware devices. Further, such a computer program may be stored in a computer-readable recording medium such as a universal serial bus (USB) memory, a compact disc (CD), a flash memory, or the like. The embodiment of the present invention may be implemented by reading and executing the computer program. Examples of the computer-readable recording medium may include a magnetic recording medium, an optical recording medium, a carrier wave medium, and the like.

The vehicle classification system and method according to the present invention have been described with reference to example embodiments. However, the present invention is not limited to the example embodiment, and it should be apparent to those skilled in the art that various alternatives, modifications, and variations can be made therein without departing from the spirit and scope of the present invention.

Accordingly, the embodiment and the accompanying drawings of the present invention are to be considered descriptive and not restrictive of the invention, and do not limit the technical scope of the invention. The scope of the invention should be to be construed by the appended claims, and all technical ideas within the scope of their equivalents should be construed as being included in the scope of the invention.

What is claimed is:

1. A vehicle classification system comprising:
   a sound generation module configured to generate a sound caused by friction with a wheel of a passing vehicle; and
   a sensor node configured to collect the sound generated by the sound generation module, analyze the collected sound to acquire axle information, and classify a model of the vehicle on the basis of the acquired axle information.

2. The vehicle classification system of claim 1, wherein the sound generation module is implemented in the form of a bar or a groove.

3. The vehicle classification system of claim 1, wherein the sound generation module is disposed behind the sensor node with respect to a vehicle traveling direction.

4. The vehicle classification system of claim 1, wherein the sensor node comprises:
   a sensor module comprising a first sensor configured to collect the sound generated by the sound generation module and a second sensor configured to detect the vehicle; and
   a control unit configured to analyze the sound collected by the first sensor to acquire the axle information and classify the model of the vehicle on the basis of the acquired axle information.

5. The vehicle classification system of claim 4, wherein the control unit activates the first sensor after receiving a vehicle detection signal from the second sensor and analyzes the sound transmitted from the first sensor to acquire the axle information.

6. The vehicle classification system of claim 4, wherein the control unit periodically acquires noise from a current road environment and removes an area corresponding to the acquired noise from the sound collected by the first sensor.

7. The vehicle classification system of claim 6, wherein the control unit determines that a sound transmitted from the first sensor after the vehicle detection signal is received from the second sensor is the sound used to acquire the axle information when the noise is acquired from the first sensor, and determines whether the second sensor detects a vehicle and then determines that sounds transmitted from the first sensor during a certain time when there is no vehicle are noise.

8. A vehicle classification method performed by a control unit, the vehicle classification method comprising:
   acquiring a vehicle detection signal from a second sensor;
   acquiring a sound transmitted from a first sensor;
   storing the acquired sound in association with the vehicle detection signal;
   determining whether the vehicle detection signal is acquired from the second sensor within a predetermined time; and
   classifying a model of each vehicle on the basis of a result of analyzing a sound stored for each vehicle detection signal when a result of the determination is that the vehicle detection signal is not acquired.

9. The vehicle classification method of claim 8, wherein the vehicle detection signal is transmitted by the second sensor to the control unit when the vehicle enters a detection area.

10. The vehicle classification method of claim 8, wherein the sound is generated by friction between a sound generation module and a wheel of the vehicle while the vehicle is passing on the sound generation module.

11. The vehicle classification method of claim 8, wherein when a result of the determination is that the vehicle detection signal is acquired, the control unit performs the acquisition of the sound.

12. The vehicle classification method of claim 8, wherein the classifying of a vehicle model comprises:
   analyzing a pattern of the sound for each vehicle detection signal to acquire axle information;
   comparing the acquired axle information with prestored axle information for each vehicle model; and
   identifying a vehicle model corresponding to the acquired axle information and classifying a current vehicle as the identified vehicle model.

13. The vehicle classification method of claim 8, further comprising:
   periodically acquiring and storing noise in a current road environment; and
   removing an area corresponding to the stored noise from the acquired sound.

14. The vehicle classification method of claim 13, wherein the periodically acquiring and storing of the noise comprises determining that a sound transmitted from the first sensor after the vehicle detection signal is received from the second sensor is the sound used to classify a vehicle model, and determining whether the second sensor detects a vehicle and then determining that sounds transmitted from the first sensor during a certain time when there is no vehicle are noise.

* * * * *